US007098279B2

(12) United States Patent
Maandi et al.

(10) Patent No.: US 7,098,279 B2
(45) Date of Patent: *Aug. 29, 2006

(54) NON-FLAMMABLE AND NON-COMBUSTIBLE ADHESIVE BONDING SYSTEMS HAVING ADHERENCE TO LOW ENERGY SURFACES

(75) Inventors: Eerik Maandi, Rocky Hill, CT (US); Brendan J. Kneafsey, Dublin (IE)

(73) Assignees: Loctite (R&D) Limited, Dublin (IE); Henkel Corporation, Rocky Hill, CT (US)

( * ) Notice: Subject to any disclaimer, the term of this patent is extended or adjusted under 35 U.S.C. 154(b) by 414 days.

This patent is subject to a terminal disclaimer.

(21) Appl. No.: 10/419,250

(22) Filed: Apr. 21, 2003

(65) Prior Publication Data

US 2004/0077783 A1 Apr. 22, 2004

Related U.S. Application Data

(63) Continuation-in-part of application No. PCT/US02/33839, filed on Oct. 23, 2002.

(60) Provisional application No. 60/419,999, filed on Oct. 22, 2002.

(51) Int. Cl.
*C08F 4/12* (2006.01)
*C08F 2/00* (2006.01)
*B32B 27/30* (2006.01)

(52) U.S. Cl. .................. 526/195; 526/217; 428/522

(58) Field of Classification Search .............. 526/195, 526/217; 428/522
See application file for complete search history.

(56) References Cited

U.S. PATENT DOCUMENTS

| 3,236,823 | A | 2/1966 | Jennes et al. ............ 260/80.5 |
| 3,275,611 | A | 9/1966 | Mottus et al. ............ 260/80.5 |
| 4,515,724 | A | 5/1985 | Ritter ....................... 260/410 |
| 4,638,092 | A | 1/1987 | Ritter ........................... 568/1 |
| 4,638,498 | A | 1/1987 | Sinniger et al. ............. 377/39 |
| 4,676,858 | A | 6/1987 | Ritter ...................... 156/307.3 |
| 4,921,921 | A | 5/1990 | Ritter ....................... 526/195 |
| 5,106,928 | A | 4/1992 | Skultchi et al. ........... 526/196 |
| 5,143,884 | A | 9/1992 | Skoultchi et al. .......... 502/160 |
| 5,286,821 | A | 2/1994 | Skoultchi .................. 526/196 |
| 5,310,835 | A | 5/1994 | Skoultchi et al. .......... 526/198 |
| 5,376,746 | A | 12/1994 | Skoultchi .................. 526/196 |
| 5,539,070 | A | 7/1996 | Zharov et al. ............. 526/198 |
| 5,616,796 | A | 4/1997 | Pocius et al. .............. 526/198 |
| 5,621,143 | A | 4/1997 | Pocius ......................... 564/8 |
| 5,681,910 | A | 10/1997 | Pocius ...................... 526/198 |
| 5,684,102 | A | 11/1997 | Pocius et al. .............. 526/198 |
| 5,686,544 | A | 11/1997 | Pocius ...................... 526/196 |
| 5,718,977 | A | 2/1998 | Pocius ...................... 428/422 |
| 5,795,657 | A | 8/1998 | Pocius et al. .............. 428/516 |
| 5,866,631 | A | 2/1999 | Nakagawa et al. ......... 523/118 |
| 5,872,197 | A | 2/1999 | Deviny .................... 526/196 |
| 5,883,208 | A | 3/1999 | Deviny .................... 526/198 |
| 5,935,711 | A | 8/1999 | Pocius et al. .............. 428/421 |
| 6,252,023 | B1 | 6/2001 | Moren ...................... 526/196 |
| 6,867,271 | B1* | 3/2005 | Maandi et al. ............. 526/195 |
| 6,939,936 | B1* | 9/2005 | Wang et al. ............... 156/327 |
| 2002/0025381 | A1 | 2/2002 | Sonnenschein et al. .. 427/372.2 |
| 2002/0028894 | A1 | 3/2002 | Sonnenschein et al. ..... 526/198 |
| 2002/0031607 | A1 | 3/2002 | Sonnenschein et al. .. 427/372.2 |
| 2002/0033227 | A1 | 3/2002 | Sonnenschein et al. .. 156/306.9 |
| 2002/0195453 | A1 | 12/2002 | McLeod ..................... 220/562 |
| 2003/0044553 | A1 | 3/2003 | Ramanathan et al. ...... 428/35.8 |
| 2003/0047268 | A1 | 3/2003 | Korchnak et al. ........... 156/94 |

FOREIGN PATENT DOCUMENTS

| JP | 62197405 A * | 9/1987 |
| JP | 2002069269 A * | 3/2002 |
| WO | WO 98/17694 | 4/1998 |
| WO | WO 99/64528 | 12/1999 |
| WO | WO 00/56779 | 9/2000 |
| WO | WO 01/32716 | 5/2001 |
| WO | WO 01/32717 A2 | 5/2001 |
| WO | WO 01/44311 A1 | 6/2001 |
| WO | WO 02/102646 | 12/2002 |

(Continued)

OTHER PUBLICATIONS

Brown, Herbert C., Boranes in Organic Chemistry, "Free-Radical Reactins of Organoboranes", pp. 433-439, Ithaca and London (1972).

(Continued)

*Primary Examiner*—Tae H. Yoon
(74) *Attorney, Agent, or Firm*—Steven C. Bauman

(57) ABSTRACT

This invention relates to (meth)acrylate based polymerizable compositions and adhesive systems prepared therefrom, which include an initiator system comprising a complex of an organoborane with a complexing agent, an aziridine-containing compound, and a carrier material with which the initiator system is unreactive and which renders the composition having a flash point above 140° F. The inventive compositions desirably have a flash point above 200° F., for each of the parts of the adhesive system. To achieve the physical properties of the inventive compositions and adhesive systems, it is desirable for the carrier material to have such flash points; however, provided that in their entirety the inventive compositions and adhesive systems have such flash points, it is not necessary for the carrier material itself to have such flash points. The inventive compositions and adhesive systems also include a package for controlling the rate of cure and indicating the extent of cure. The inventive compositions and adhesive systems are particularly well suited to bonding applications which involve at least one low energy bonding surface, for example, polyolefin, polyethylene, and polypropylene surfaces.

32 Claims, No Drawings

FOREIGN PATENT DOCUMENTS

WO    WO 03/040151 A1    5/2003

OTHER PUBLICATIONS

Pelter, A. and Smith, K., "Organic Boron Compounds", 689-708, 728-732, and 773-784, London (1972).

Barton, Sir Derek and Ollis, W. David, Comprehensive Organic Chemistry, The Synthesis and Reactions of Organic Compounds, pp. 791-798 and 883-885, Great Britain (1979).

Roscher, Christof, et al., "Novel Radiation Curable Nanocomposites with Outstanding Material Properties", 322-329 (2002).

* cited by examiner

NON-FLAMMABLE AND NON-COMBUSTIBLE ADHESIVE BONDING SYSTEMS HAVING ADHERENCE TO LOW ENERGY SURFACES

RELATED APPLICATION

This application is a continuation-in-part of International Patent Application No. PCT/US02/33839 filed on Oct. 23, 2002 and U.S. Provisional Application No. 60/419,999 filed on Oct. 22, 2002, the contents of both of which are incorporated herein by reference.

BACKGROUND OF THE INVENTION

1. Field of the Invention

This invention relates to (meth)acrylate based polymerizable compositions and adhesive systems prepared therefrom, which include an initiator system, an aziridine-containing compound, and a carrier material with which the initiator system is unreactive. The inventive compositions demonstrate a flash point above 140° F., desirably above 200° F., for each of the parts of the adhesive system. The inventive compositions and adhesive systems also include a package for controlling the rate of cure and indicating the extent of cure. The inventive compositions and adhesive systems are particularly well suited to bonding applications which involve at least one low energy bonding surface, for example, polyolefin, polyethylene, and polypropylene surfaces.

2. Brief Description of Related Technology

Low energy surfaces such as polyolefins, i.e., polyethylene, polypropylene, polybutene, polyisoprene, and copolymers thereof, are well known to be difficult to bond to each other and to other surfaces using adhesive bonding technology since they have few active bonding sites available at the free surfaces. Low energy surfaces are defined as those having surface energies less than 45 mJ/m$^2$, more typically less than 40 mJ/m$^2$, or less than 35 mJ/m$^2$.

Bonding low energy surfaces by surface pre-treatments such as flame treatments, plasma treatments, oxidation, sputter etching, corona discharge, or primer treatments with a high surface energy material is well known. Such treatments disrupt the bonds at the surface of the low energy material providing sites which are reactive and which can participate in bonding reactions with adhesive materials. However, such surface pre-treatments are usually undesirable, in that they add cost to the process, they are not particularly reproducible in their results, and the effect of the pre-treatments wears off with time so the pre-treated surfaces must be re-pre-treated if they are not bonded within a reasonable period of time.

The chemistry of organic boron compounds has been studied in detail [see e.g. D. Barton and W. D. Ollis, "Comprehensive Organic Chemistry", Vol. 3, Part 14, Pergamon Press (1979) and H. C. Brown, *Boranes in Organic Chemistry*, Cornell University Press, Ithaca, N.Y. (1972)]. The use of organoboranes such as the trialkylboranes including triethylborane and tributylborane for initiating and catalyzing the polymerization of vinyl monomers is well known. However, such organoborane compounds are known to be flammable in air so that the compounds and compositions containing them require special handling and the compositions have poor shelf stability [see e.g. U.S. Pat. No. 3,236,823 (Jennes), and the Background section of U.S. Pat. No. 5,935,711 (Pocius), at col. 2].

Certain boron alkyl compounds and their use as initiators of polymerization are described in U.S. Pat. Nos. 4,515,724, 4,638,092, 4,638,498, 4,676,858 and 4,921,921 (the "Ritter patents").

U.S. Pat. Nos. 5,106,928, 5,143,884, 5,286,821, 5,310,835 and 5,376,746 disclose a two-part initiator system for acrylic adhesive compositions, in which the first part includes a reportedly stable organoborane amine complex and the second part includes a destabilizer or activator such as an organic acid or an aldehyde.

Japanese Patent Publication No. S48-18928 describes a method for adhering polyolefin or vinyl polymers using an adhesive obtained by adding trialkylboron to a vinyl monomer, with or without vinyl polymer. Examples of trialkylboron include triisopropylboron, tri-n-butylboron, tripropylboron and tri-tert-butylboron.

U.S. Pat. No. 3,275,611 (Mottus) describes a process for polymerizing unsaturated monomers with a catalyst comprising an organoboron compound, a peroxygen compound and an amine complexing agent for the boron compound.

It is well known that the bonding of polyolefin substrates and other low surface energy substrates causes particular difficulties. Attempts have been made to overcome these difficulties by the extensive and expensive substrate surface preparation described above, or by priming the surface with a high surface energy primer. However, it is desired to develop adhesive compositions, which will bond low surface energy substrates without such surface preparation.

U.S. Pat. No. 5,539,070 (Zharov), and U.S. Pat. Nos. 5,616,796, 5,621,143, 5,681,910, 5,684,102, 5,686,544, 5,718,977, 5,795,657, 5,883,208 and the '711 patent describe organoborane amine complexes which can be used in systems that initiate the polymerization of acrylic monomers in compositions useful for bonding low surface energy plastics substrates such as polyethylene, polypropylene and polytetrafluoroethylene.

The '711 patent describes polymerization initiator systems comprising an organoborane amine complex and an aziridine-functional material. It is reported that a wide variety of aziridine-functional materials may be used, including monofunctional aziridines and aziridines, although the latter are preferred, especially if they have an aziridine functionality of 2 to 4.

International Patent Publication No. WO 99/64528 describes low odor polymerizable compositions comprising monomer blends and organoborane amine complex initiators. These systems require the preparation of trialkyl borane amine complexes to achieve the desired performance and shelf stability. The manufacture of such complexes is an undesirably complicated process. Further, the presence of the amines results in cured adhesives that have a tendency to become yellow in color on aging.

International Patent Publication No. WO 01/44311 also describes amine organoborane complex polymerization initiators in bonding compositions for low surface energy substrates. U.S. Patent Application Publication Nos. US 2002/0028894, US 2002/0025381, US 2002/0031607 and US 2002/0033227 describe such compositions in which the amine is selected from amines having: an amidine structural component; aliphatic heterocycles having at least one nitrogen in the heterocyclic ring; an alicyclic compound having bound to the ring a substituent having an amine moiety; primary amines which in addition to a primary amine have one or more hydrogen bond accepting groups of an ether, polyether, thioether, or halogen wherein there is an alkylene chain of at least two carbon atoms between the primary amine and the hydrogen bond accepting group; and conjugated imines.

International Patent Publication No. WO 02/102646 describes a method for making an automobile assembly using a polymerisable adhesive containing an organoborane/amine complex. The amines used to complex the organoborane can be any amines which complex the organoborane and which can be decomplexed when exposed to a decomplexing agent, such as those disclosed in U.S. Pat. Nos. 5,539,070, 5,106,928, 5,686,544 and 5,883,208, or in International Patent Publication No. WO 01/44311. In particular the amine may be selected from amines having: an amidine structural component; aliphatic heterocycles having at least one nitrogen in the heterocyclic ring; an alicyclic compound having bound to the ring a substituent having an amine moiety; primary amines which in addition have one or more hydrogen bond accepting groups wherein there are at least two carbon atoms between the primary amine and the hydrogen bond accepting group; and conjugated imines.

International Patent Publication No. WO 01/32716 ("PCT '716") acknowledges that while complexes of an organoborane and an amine may be useful in many applications, certain problems may arise due to the use of amine complexing agents in such conventional complexes. For example, when the complexes contain a primary amine, adhesives prepared therefrom may be prone to discoloration, such as yellowing; further, when including reactive diluents, such as aziridines described in International Patent Publication No. WO 98/17694, for example, in compositions containing the complexes, the diluents may prematurely react with protic amines (i.e., those amines in which a nitrogen atom is bonded to at least one hydrogen atom) in such complexes, prematurely decomplexing the organoborane initiator.

PCT '716 therefore proposes a complex of an organoborane and a complexing agent of at least one hydroxide or alkoxide, particularly a complex represented by the formula

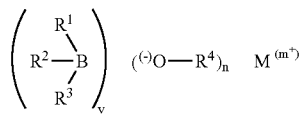

where $R^1$ is an alkyl group having 1 to about 10 carbon atoms; $R^2$ and $R^3$ may be the same or different and are selected from alkyl groups having 1 to about 10 carbon atoms and phenyl-containing groups; the value of "v" is selected so as to provide an effective ratio of oxygen atoms of the alkoxides and/or hydroxides to boron atoms in the complex; each $R^4$ is independently selected from hydrogen or an organic group (e.g., an alkyl or alkylene group); $M^{(m+)}$ represents a countercation [comprising a monovalent cation, such as a Group IA metal (e.g., lithium, sodium and potassium) cation or onium, or a multivalent cation, such as a Group IIA metal (e.g., calcium and magnesium) cation]; n is an integer greater than zero; and m is an integer greater than zero. Particular complexing agents are stated to have a countercation selected from sodium, potassium and tetraalkylammoniums. When any $R^4$ is hydrogen, the complexing agent is said to comprise at least one hydroxide. When any $R^4$ is an organic group, the complexing agent is said to comprise at least one alkoxide.

According to PCT '716, the complexing agent (i.e., the hydroxide or alkoxide) is used in the form of a salt. That is, the complexing agent is stabilized by a suitable countercation such that the complexing agent is capable of complexing the initiator. Thus, in the Formula, $M^{(m+)}$ represents a countercation that stabilizes the complexing agent, not a cation that forms an ionic compound with the organoborane initiator.

PCT '716 states that hydroxides and alkoxides provide strong coupling to organometallic initiators, such as organoboranes, with the resulting complexes having excellent oxidative stability. Thus, complexing agents of at least one hydroxide, alkoxide, or mixtures thereof are said to be particularly beneficial. Such a complex is stated to be a tightly co-ordinated salt formed by association of a Lewis acid (the initiator) and a Lewis base (the hydroxide or alkoxide). This indicates that the oxygen atom of the alkoxide or hydroxide is bonded or co-ordinated to the boron atom of the initiator.

In designing and developing a product which is to be transported, one must be cognizant of the transportation regulations of the various countries to which, through which, and/or from which the product will be transported. Thus, to the extent that a product contains a flammable or combustible constituent, a product developer should consider whether and to what extent the ability of the product to be shipped may be impaired, such as through special packaging requirements or particular modes of transportation. To this end, flammability is often considered in connection with a flash point of less than 140° F. and combustibility is often considered in connection with a flash point of less than 200° F.

International Patent Application No. PCT/US02/33839 ("the parent application"), of which this application is a continuation-in-part, is directed to a polymerizable composition, which includes a free radical polymerizable component, such as one based on (meth)acrylates, an initiator system comprising an alkylated borohydride or borate of formula XII as defined below, an aziridine-containing compound, and a carrier therefor which is unreactive toward the alkylated borohydride orborate. The inventive compositions of the parent application demonstrate a flash point greater than 140° F. (60° C.) and desirably greater than 200° F. (93.3° C.).

In addition, another aspect of the invention of the parent application provides an indicator system which controls the rate of cure by the addition of a halogen solution, such as an iodine solution, and which also serves as an indicator for when cure begins.

The initiator compounds of the parent application are ionic compounds. Similar concerns with regard to transportation as discussed above apply to compositions of the prior art in which the initiator system comprises a covalent complex of an organoborane and a complexing agent such as an amine.

Despite the work of many in this field, there is a need for polymerizable compositions for bonding low surface energy substrates, choices among such as polyolefins, and for end users to have a variety of such compositions which achieve that result through different technical strategies, and for such compositions to be transportable without excessive restrictions due to flammability or combustibility.

SUMMARY OF THE INVENTION

The present invention is directed to a polymerizable composition, which includes a free radical polymerizable component, such as one based on (meth)acrylates, an initiator system comprising an organoborane complex, an aziridine-containing compound, and a carrier therefor which is unreactive toward the organoborane complex and which renders the composition having a flash point greater than 140° F. (60° C.). The inventive compositions desirably demonstrate a flash point greater than 200° F. (93.3° C.).

In addition, another aspect of the invention of the present application provides a polymerizable composition which includes a free radical polymerizable component, such as one based on (meth)acrylates, and an initiator system comprising an organoborane complex in combination with an indicator system which controls the rate of cure by the addition of a halogen solution, such as an iodine solution, and which also serves as an indicator for when cure begins.

DETAILED DESCRIPTION OF THE INVENTION

For purposes of the present invention, the terms (meth) acrylate and (meth)acrylic are used synonymously with regard to the monomer and monomer-containing component. The terms (meth)acrylate and (meth)acrylic include acrylate, methacrylate, acrylic, and methacrylic.

And, the term "non-flammable" will mean a flash point of greater than about 200° F. (94° C.), whereby heating is required for the material to catch fire; and the term "flammable" will mean the material is ignitable with a spark rather than by heating, and having a flash point of about less than 100° F. (38° C.). Generally, compounds which have a flash point between 140° F.–200° F. (60° C.–93° C.) are classified as "combustible". These definitions are believed to be generally accepted ones in accordance with those set by the U.S. Department of Transportation ("DOT").

The present invention relates to polymerizable (meth) acrylate compositions and adhesive systems based on such (meth)acrylate compositions, which when applied onto a substrate results in the formation of a polymeric adhesive material which strongly adheres to surfaces, particularly low energy surfaces such as polyolefins.

The polymerization reaction promoted by the initiator systems also causes bonding of the adhesive to the surfaces being bonded. The speed and extent of the polymerization can be controlled by varying the ratio of the various constituents. And in another aspect of the invention, the rate of cure may be controlled by the addition of a halogen solution, such as an iodine solution, which also serves as an indicator for when cure begins.

The adhesive compositions disclosed herein are useful for bonding a large range of substrates including metals, plastics and glass to similar or different substrates, especially low energy surfaces having a surface energy of less than 45 mJ/m². In addition to polyethylene and polypropylene, these low energy surfaces include polyolefins, for example, acrylonitrile-butadiene-styrene and polytetrafluoroethylene, or relatively low surface energy substrates such as polycarbonate, to similar substrates, to each other, or to different substrates including metals, other plastics and glass.

Also disclosed herein are kits comprising the (meth) acrylate compositions for use as adhesive systems, the resultant bonded assembly using the (meth)acrylate based adhesive system of the present invention, and a method of bonding low energy substrates with the (meth)acrylate based adhesive system of the present invention.

The ethylenically unsaturated, free radical polymerizable monomers useful in the present invention preferably comprise addition polymerizable, non-gaseous (boiling point above 100° C. at normal atmospheric pressure), ethylenically-unsaturated organic compounds containing at least one, and preferably at least two, terminal ethylenically unsaturated groups, and being capable of forming a high weight average molecular weight polymer by free radical initiated, chain propagating addition polymerization.

The (meth)acrylate component may be selected from mono(meth)acrylate monomers comprising formula I:

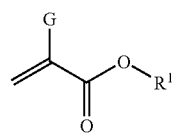

I where G is hydrogen, halogen, or an alkyl having from 1 to 4 carbon atoms, $R^1$ has from 1 to 16 carbon atoms and is an alkyl, cycloalkyl, alkenyl, cycloalkenyl, alkaryl, aralkyl, or aryl group, optionally substituted or interrupted with silane, silicon, oxygen, halogen, carbonyl, hydroxyl, ester, carboxylic acid, urea, urethane, carbamate, amine, amide, sulfur, sulfonate, sulfone or tetrahydrafurfuryl, such as citronellyl (meth)acrylates, hydroxylethyl (meth)acrylates, hydroxypropyl (meth)acrylates, tetrahydrodicyclopentadienyl (meth)acrylate, triethylene glycol (meth)acrylates, and tetrahydrafurfuryl (meth)acrylates;

a di- or tri-(meth)acrylate monomers, such as those selected from polyethylene glycol di(meth)acrylates, bisphenol-A di(meth)acrylates, tetrahydrofurane di(meth) acrylates, hexanediol di(meth)acrylates, polythylene glycol di(meth)acrylates, such as triethylene glycol di(meth)acrylate, tripropylene glycol di(meth)acrylate, tetraethylene glycol di(meth)acrylate, diethylene glycol di(meth)acrylate, 1,4-butanediol di(meth)acrylate, 1,6-hexanediol di(meth) acrylate, pentaerythritol tetra(meth)acrylate, trimethylol propane tri(meth)acrylate, trimethylol propane tri(meth) acrylate, di-pentaerythritol monohydroxypenta(meth)acrylate, pentaerythritol tri(meth)acrylate, ethoxylated bisphenol-A di(meth)acrylate, ethoxylated trimethylolpropane tri (meth)acrylates, trimethylolpropane propoxylate tri(meth) acrylates, or combinations thereof;

a di(meth)acrylate ester comprising formula II:

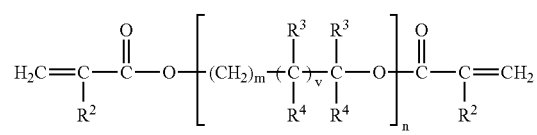

II where $R^2$ is hydrogen, halogen, or an alkyl having about 1 to about 4 carbon atoms, $R^3$ is hydrogen, an alkyl having about 1 to about 4 carbon atoms, hydroxyalkyl having about 1 to about 4 carbon atoms or

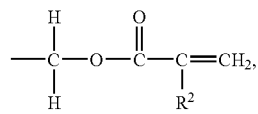

$R^4$ is hydrogen, hydroxy or

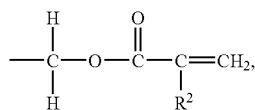

and m is 1 to 8, n is 1 to 20, and v is 0 or 1. acrylate esters comprising formula III:

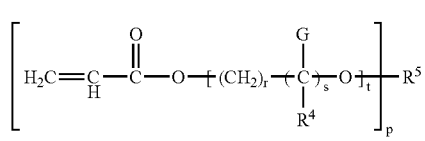

where r is zero or a positive integer, s is zero or 1, t is an integer from 1 to 20, and p is 2, 3 or 4; G and $R^4$ are as defined above; and $R^5$ denotes an organic radical of valency s linked through a carbon atoms or carbon atoms thereof to the indicated t number of oxygen atoms. Preferably, r, s, and t are each 1, G is hydrogen or methyl, and $R^5$ is a hydrocarbon residue of an aliphatic polyhydric alcohol having from 2 to 6 carbon atoms, such as a pentaerythrityl group. A specific example of such compounds is pentaerythritoyl tetrakis (dimethylene glycol acrylate);

(meth)acrylate esters comprising formula IV:

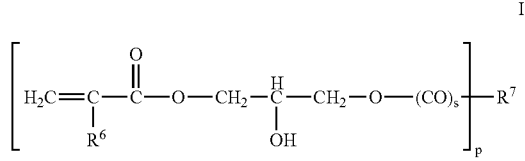

where s and p are as defined above, $R^6$ is hydrogen or methyl, and $R^7$ is an organic radical of valency p, linked through a carbon atom thereof other than the carbon atom of a carbonyl group. More particularly, when s is zero, $R^7$ may denote the residue, containing from 1 to 60 carbon atoms, of an alcohol or phenol having p hydroxyl groups. $R^7$ may thus represent an aromatic, araliphatic, alkaromatic, cycloaliphatic, heterocyclic, or heterocycloaliphatic group, such as an aromatic group containing only one benzene ring, optionally substituted by chlorine, bromine or an alkyl group of from 1 to 9 carbon atoms, or an aromatic group comprising a chain of two to four benzene rings, optionally interrupted by ether oxygen atoms, aliphatic hydrocarbon groups of 1 to 4 carbon atoms, or sulphone groups, each benzene ring being optionally substituted by chloride, bromine or an alkyl group of from 1 to 9 carbon atoms, or a saturated or unsaturated, straight or branched-chain aliphatic group, which may contain ether oxygen linkages and which may be substituted by hydroxyl groups, especially a saturated or monoethylenically unsaturated straight chain aliphatic hydrocarbon group of from 1 to 8 carbon atoms.

Specific examples of such groups are the aromatic groups of the formulae —$C_6H_4C(CH_3)_2C_6H_4$—, in which case p is 2, and —$C_6H_4(CH_2C_6H_3$—)$_w$—$CH_2C_6H_4$—, where w is 1 or 2, in which case p is 3 or 4, and the aliphatic groups of formula —$CH_2CHCH_2$— or —$CH_2CH(CH_2)_3CH_2$—, in which case p is 3, or of formula —$(CH_2)_4$—, —$CH_2CH=CHCH_2$—, —$CH_2CH_2OCH_2CH_2$—, or —$(CH_2CH_2O)_2CH_2CH_2$—, in which case p is 2. When s is 1, $R^7$ may represent the residue, containing from 1 to 60 carbon atoms, of an acid having p carboxyl groups, preferably a saturated or ethylenically unsaturated, straight chain or branched aliphatic hydrocarbon group of from 1 to 20 carbon atoms, which may be substituted by chlorine atoms and which may be interrupted by ether oxygen atoms and/or by carbonyloxy (—COO—) groups, or a saturated or ethylenically unsaturated cycloaliphatic or aliphatic-cycloaliphatic hydrocarbon group of at least 4 carbon atoms, which may be substituted by chlorine atoms, or an aromatic hydrocarbon group of from 6 to 12 carbon atoms which may be substituted by chlorine or bromine atoms.

Further preferred compounds where s is 1 include those in which $R^7$ represents a saturated or ethylenically unsaturated straight chain or branched aliphatic hydrocarbon group of from 1 to 8 carbon atoms, optionally substituted by a hydroxyl group, or a saturated or ethylenically unsaturated straight chain or branched aliphatic hydrocarbon group of from 4 to 50 carbon atoms and interrupted in the chain by carbonyloxy groups, or a saturated or ethylenically unsaturated monocyclic or bicyclic cycloaliphatic hydrocarbon group of 6 to 8 carbon atoms, or an ethylenically unsaturated cycloaliphatic-aliphatic hydrocarbon group of from 10 to 51 carbon atoms, or a mononuclear aromatic hydrocarbon group of from 6 to 8 carbon atoms. Specific examples of these carboxylic acid residues are those of formula —$CH_2CH_2$—, $CH=CH$—, and —$C_6H_4$— where p is 2. Specific examples of suitable compounds of the preceding formula are epoxy acrylates such as 1,4-bis(2-hydroxy-3-(acryloyloxy)propoxy)butane, poly(2-hydroxy-3-(acryloyloxy)propyl)ethers of bis(4-hydroxyphenyl)methane (bisphenol F), 2,2-bis(4-hydroxyphenyl)propane (bisphenol A) and phenol-formaldehyde novolaks, bis(2-hydroxy-3-acryloyloxypropyl)adipate and the methacryloyloxy analogues of these compounds;

urethane acrylates and ureido acrylates comprising formula V:

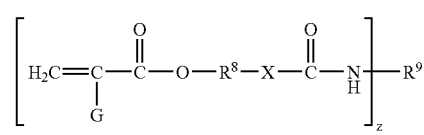

where G is as defined above, $R^8$ denotes a divalent aliphatic, cycloaliphatic, aromatic, or araliphatic group, bound through a carbon atom or carbon atoms thereof indicated at the —O— atom and —X— atom or group, X denotes —O—, —NH—, or —N(alkyl)-, in which the alkyl radical has from 1 to 8 carbon atoms, z is an integer of at least 2 and at most 6, and $R^9$ denotes a z-valent cycloaliphatic, aromatic, or araliphatic group bound through a carbon atom or carbon atoms thereof to the indicate NH groups. Preferably $R^8$ denotes a divalent aliphatic group of 2 to 6 carbon atoms and $R^9$ denotes one of the following: a divalent aliphatic group of 2 to 10 carbon atoms, such as a group of formula: —$(CH_2)_6$—, $CH_2C(CH_3)_2CH_2CH(CH_3)(CH_2)$—, or —$CH_2CH(CH_3)CH_2C(CH_3)_2CH_2)_2$—; or a phenylene group, optionally substituted by a methyl group or a chlorine atom; a naphthylene group; a group of formula:

—C₆H₄C₆H₄—, —C₆H₄CH₂C₆H₄—, or —C₆H₄C(CH₃)₂ C₆H₄—; or mononuclear alkylcycloalkylene or alkylcycloalkylalkylene group, such as a methylcyclohex-2,4-ylene, methylcyclohex-2,6-ylene, or 1,3,3-trimethylcyclohex-5-ylenemethyl group. Specific examples include 2,4- and 2,6-(bis(2-acryloyloxyethoxy carbonamido) toluene and the corresponding methacryloyloxy compounds.

The organoborane complex comprised in the initiator system may be any suitable complex of an organoborane with a complexing agent, particularly (but not exclusively) a complexing agent of one of the types disclosed hereinbefore. A "complex" is understood to be a tightly coordinated salt formed by association of a Lewis acid (e.g. initiator) and a Lewis base (e.g. amine).

Suitably the initiator system also comprises a compound reactive with the organoborane complex to free an organoborane therefrom to initiate polymerization of the free-radically polymerizable monomer, particularly a decomplexer of one of the types disclosed in the prior art references identified hereinbefore.

One suitable type of initiator system comprises a complex of an organoborane with an amine. The amine may be of any type that complexes the organoborane and that can be decomplexed to free the organoborane when desired.

As reported in International Patent Publication No. WO 99/64528, such organoborane amine complexes may be represented by the following general structure (VI):

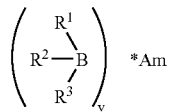

where $R^1$ is $C_1$–$C_{10}$ alkyl; $R^2$ and $R^3$, which may be the same or different, are H, D, $C_1$–$C_{10}$ alkyl or $C_3$–$C_{10}$ cycloalkyl, phenyl, or phenyl-substituted $C_1$–$C_{10}$ alkyl or $C_3$–$C_{10}$ cycloalkyl, provided that any two of $R^1$–$R^3$ may optionally be part of a carbocyclic ring; and Am is an amine. Preferably, $R^1$, $R^2$ and $R^3$ are independently selected from $C_1$–$C_{10}$ alkyl, especially $C_1$–$C_5$ alkyl. Most preferably, $R_1$, $R^2$ and $R^3$ are the same.

The value of v is selected so as to provide an effective ratio of primary or secondary amine nitrogen atoms to boron atoms in the complex. The ratio of primary or secondary amine nitrogen atoms to boron atoms in the complex should broadly be about 0.5:1 to 4:1, preferably about 1:1.

Suitable initiators include trimethylborane, triethylborane, tri-n-propylborane, triisopropylborane, tri-n-butylborane, triisobutylborane, and tri-sec-butylborane.

The amine, Am, may comprise a variety of structures, for example, any primary or secondary amine, polyamine containing a primary or secondary amine, or ammonia as reported in U.S. Pat. No. 5,539,070 (Zharov) at column 5 lines 41 to 53, which is incorporated herein by reference, U.S. Pat. No. 5,106,928 (Skoultchi) at column 2 line 29 to 58, which is incorporated herein by reference, U.S. Pat. No. 5,686,544 (Pocius) at column 7, line 29 to column 10 line 36, which is incorporated herein by reference; monoethanolamine, secondary dialkyl diamines or polyoxyalkylenepolyamines; and amine terminated reaction products of diamines and compounds having two or more groups reactive with amines as reported in U.S. Pat. No. 5,883,208 (Deviny) at column 7 line 30 to column 8 line 56, which is incorporated herein by reference. Among the reaction products described in the '208 patent, particular diprimary amines include alkyl diprimary amines, aryl diprimary amines, alkyaryl diprimary amines and polyoxyalkylene diamines; and compounds reactive with amines include compounds which contain two or more groups of carboxylic acids, carboxylic acid esters, carboxylic acid halides, aldehydes, epoxides, alcohols and acrylate groups. Suitable amines include n-octylamine, 1,6-diaminohexane (1,6-hexane diamine), diethylamine, dibutyl amine, diethylene triamine, dipropylene diamine, 1,3-propylene diamine (1,3-propane diamine), 1,2-propylene diamine, 1,2-ethane diamine, 1,5-pentane diamine, 1,12-dodecanediamine, 2-methyl-1,5-pentane diamine, 3-methyl-1,5-pentane diamine, triethylene tetraamine, diethylene triamine. Preferred polyoxyalkylene polyamines include polyethyleneoxide diamine, polypropyleneoxide diamine, triethylene glycol propylene diamine, polytetramethyleneoxide diamine and polyethyleneoxidecopolypropyleneoxide diamine.

In one aspect, the amine in the organoborane/amine complex may suitably be selected from the group of amines having an amidine structural component; aliphatic heterocycles having at least one nitrogen in the heterocyclic ring wherein the heterocyclic compound may also contain one or more nitrogen atoms, oxygen atoms, sulphur atoms, or double bonds in the heterocycle; primary amines which in addition have one or more hydrogen bond accepting groups wherein there are at least two carbon atoms, preferably at least three carbon atoms, between the primary amine and the hydrogen bond accepting group, such that due to inter- or intramolecular interactions within the complex the strength of the B—N bond is increased; and conjugated imines. Particular hydrogen bond accepting groups include: primary amines, secondary amines, tertiary amines, ethers, halogens, polyethers or polyamines. The term "heterocycle" refers to a compound having one or more aliphatic cyclic rings of which one of the rings contains nitrogen. The amidines or conjugated imines may be straight or branched chain or cyclic.

In a particular embodiment, the amine part of the complex comprises a compound having a primary amine and one or more hydrogen bond accepting groups, wherein there are at least two carbon atoms between the primary amine and hydrogen bond accepting groups. Suitably, the amine corresponds to the formula (VII):

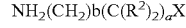

where $R^2$ is separately in each occurrence hydrogen or a $C_{1-10}$ alkyl (e.g. methyl) or $C_{3-10}$ cycloalkyl; X is a hydrogen bond accepting moiety; a is an integer of 1 to 10; and b is separately in each occurrence an integer of 0 to 1, and the sum of a and b is from 2 to 10. Suitably, X is separately in each occurrence a hydrogen accepting moiety and, when the hydrogen accepting moiety is an amine, it is most suitably a tertiary or a secondary amine. More particularly, X may suitably be separately in each occurrence —N(R⁸)ₑ, —OR¹⁰, or a halogen, wherein R⁸ is separately in each occurrence $C_{1-10}$ alkyl (e.g. methyl), $C_{3-10}$ cycloalkyl or —(C(R²)₂)_d—W; R¹⁰ is separately in each occurrence, $C_{1-10}$ alkyl (e.g. methyl), $C_{3-10}$ cycloalkyl, or —(C(R²)₂)_d—W; d is an integer of 1 to 4; and e is 0, 1, or 2. W may be hydrogen or $C_{1-10}$ alkyl or X. Particular amines include:

dimethylaminopropylamine, methoxypropylamine, dimethylaminoethylamine, dimethylaminobutylamine, methoxybutylamine, methoxy-ethylamine, ethoxypropylamine, propoxypropylamine, amine terminated polyalkylene ethers (such as trimethylolpropanetris(poly(propyleneglycol) amine terminated)ether), aminopropylmorpholine, isophoronediamine, and aminopropylpropanediamine.

In another embodiment, the amine may be an aliphatic heterocycle having at least one nitrogen in the heterocycle. The heterocyclic compound may also contain one or more of nitrogen, oxygen, sulfur or double bonds. In addition, the heterocycle may comprise multiple rings wherein at least one of the rings has a nitrogen in the ring. Particular compounds of this type include morpholine, piperidine, pyrolidine, piperazine, 1,3,3 trimethyl 6-azabicyclo[3,2,1] octane, thiazolidine, homopiperazine, aziridine, 1,4-diazabicylo[2.2.2]octane ("DABCO"), 1-amino-4-methylpiperazine, and 3-pyrroline.

In yet another embodiment, the amine which is complexed with the organoborane is suitably an amidine. Any compound with amidine structure, where the amidine has sufficient binding energy with the organoborane as described in International Patent Publication No. WO 01/44311, may be used. Among particular amidines are 1,8 diazabicyclo[5,4]undec-7-ene; tetrahydropyrimidine; 2-methyl-2-imidazoline; and 1,1,3,3-tetramethylguanidine.

In a further embodiment, the amine which is complexed with the organoborane is suitably a conjugated imine. Any compound with a conjugated imine structure, wherein the imine has sufficient binding energy with the organoborane as described in International Patent Publication No. WO 01/44311 may be used. The conjugated imine can be a straight or branched chain imine or a cylic imine. Among preferred conjugated imines are 4-dimethylaminopyridine; 2,3-bis(dimethylamino)cyclopropeneimine; 3-(dimethylamine)acroleinimine; 3-dimethylamino)methacroleinimine.

Further information about the foregoing amines is reported in International Patent Publication No. WO 01/44311 at page 6 line 23 to page 11 line 3, which is incorporated herein by reference.

Complexes of organoborane initiators and amidines may be represented by the following general formula (VIII):

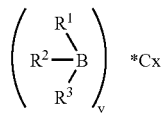

where $R^1$, $R^2$, and $R^3$ are as defined above and Cx represents an amidine complexing agent. The value of 'v' is selected so as to provide an effective ratio of amidine nitrogen atoms to boron atoms in the complex. The ratio of amidine nitrogen atoms to boron atoms in the complex should broadly be about 0.5:1 to about 4:1, particularly about 1:1 to about 2:1, more particularly about 1:1 to about 1.5:1, and most particularly about 1:1. "Amidines" are defined in International Patent Publication No. WO 01/32717 as compounds having at least one N=C=N unit in its structure. The amidines may be vinyligous, i.e., they may have at least one N=C—(C=)$_n$ —N unit in the structure where n is an integer greater than zero.

In the foregoing formula VIII, Cx may suitably be represented by the following formula (IX):

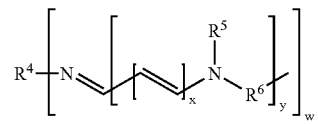

where $R^4$ is hydrogen or an organic group such as alkyl, alkylene, alkenylene, arylene, or aryl group; $R^5$ and $R^6$ are independently a monovalent organic group or part of a cyclic (including a bicyclic) structure; w is an integer greater than zero, e.g. 1 to about 3; x is an integer greater than or equal to zero, e.g. 3 or less; and y is an integer greater than zero, e.g. 1 or 2. Together, $R^4$, $R^5$, and $R^6$ may form a cyclic structure (e.g., a ring) connecting to any suitable location on the amidine. For example, $R^4$ and $R^5$ may be included in a cyclic structure or $R^4$, $R^5$, and $R^6$ may be included in a bicyclic structure.

Certain amidine complexes are known. For example, see certain of the chemical structures disclosed in Noth H. et al., ""B- and "N-Kernresonanzstudien an tetrakoordinierten Bor-Stickstoff-Verbindungen," *Chem. Ber.*, 107, pp. 3070–8S (1974). Particular examples of complexing agents include those prepared from the following amidines: N,N, N',N'-tetramethylguanidine; 1,S-diazabicyclo[5.4.0]undec-7-ene; 1,5-diazabicyclo[4.3.0]non-5-ene; 2-methylimidazole; 2-methylimidazoline and 4-(N,N-dimethylamino)-pyridine. Further information concerning the amidine complexing agents is reported in International Patent Publication No. WO 01/32717 at page 6 line 10 to page 10 line 16, which is incorporated herein by reference.

Complexes of organbboranes and complexing agents comprising a hydroxide or an alkoxide may likewise be represented by formula (VIII):

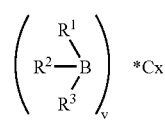

where $R^1$, $R^2$, and $R^3$ are as defined above and Cx represents a complexing agent comprising a hydroxide or an alkoxide. The value of 'v' is selected so as to provide an effective ratio of oxygen atoms of the alkoxides and/or hydroxides to boron atoms in the complex. The ratio of oxygen atoms of the alkoxides and/or hydroxides to boron atoms in the complex should broadly be about 0.5:1 to about 4:1, preferably about 1:1 to about 2:1, more preferably about 1:1 to about 1.5:1, and most preferably about 1:1.

Preferably, Cx and complexing agents used in this embodiment of the invention are represented by formula (X):

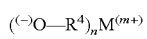

where each $R^4$ is independently selected from hydrogen or an organic group (e.g. an alkyl or alkylene group); $M^{(m+)}$ represents a countercation [comprising a monovalent cation, such as a Group IA metal (e.g., lithium, sodium and potassium) cation or onium, or a multivalent cation, such as a Group IIA metal (e.g., calcium and magnesium) cation]; n is an integer greater than zero; and m is an integer greater than zero. Each $R^4$ may be hydrogen in a complexing agent or each R⁴ may be an organic group in a complexing agent. When any R⁴ is hydrogen, the complexing agent comprises at least one hydroxide. When any R⁴ is an organic group, the complexing agent comprises at least one alkoxide.

The complexing agent may also include a mixture of at least one hydroxide and at least one alkoxide. Typically, n is 1 or 2 and m is 1 or 2. Most suitably, n and m are the same integer, most preferably 1.

In general, the complexing agent is used in the form of a salt. That is, the complexing agent is stabilized by a suitable countercation such that the complexing agent is capable of complexing the initiator. Thus, $M^{(m+)}$ represents a countercation that stabilizes the complexing agent, not a cation that forms an ionic compound with the organoborane initiator. Any suitable countercation or combinations thereof can be used. The countercations can be monovalent or multivalent, as indicated by the superscript, "m+." When "m+" is 1, the cation is monovalent. For example, monovalent cations of the Group IA metals (e.g., lithium, sodium, and potassium) can be used.

Other suitable monovalent countercations include oniums, which generally conform to formula (XI):

where each $R^5$ is independently selected from monovalent organic groups and z represents an integer greater than one, typically 2, 3, or 4. Typically, X is a Group VA, VIA, or VIIA metalloid (e.g., nitrogen, sulfur, iodine, and phosphorus). Exemplary onium cations include tetraalkylammoniums (e.g., tetramethylammonium and tetrabutylammonium), triphenylsulfonium, diphenyliodonium, and tetrabutylphosphonium.

When "m+" is greater than 1, the cation is multivalent. Exemplary multivalent cations include those cations of the Group IIA metals (e.g., calcium and magnesium).

Particularly suitable complexing agents have a countercation selected from sodium, potassium, and tetraalkylammoniums.

Certain complexes comprising hydroxides are known in the art. For example, see certain of the chemical structures disclosed in Brown, H. C., *Hydroboranes*, pp. 55–56 (1962).

Further particulars of the foregoing complexes and their methods of preparation are disclosed in International Patent Publication No. WO 01/32716, the contents of which are incorporated herein by reference.

The alkylated borohydrides and borates which are used as initiators of polymerization in the parent application and which can be used in addition to the organoborane complex initiators in the present invention comprise formula (XII):

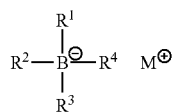

where $R^1$ is $C_1-C_{10}$ alkyl, straight chain or branched, $R^2$ and $R^3$, which may be the same or different, are H, D, $C_1-C_{10}$ alkyl or $C_3-C_{10}$ cycloalkyl, phenyl, or phenyl-substituted $C_1-C_{10}$ alkyl or $C_3-C_{10}$ cycloalkyl, provided that any two of $R^1-R^3$ may optionally be part of a carbocyclic ring, $R^4$ is H, D or $C_1-C_{10}$ alkyl, and M⁺ is a metal ion or a quaternary ammonium ion comprising formula VII.

The metal ion may be an alkali metal ion such as lithium, sodium, potassium, or cesium, particularly lithium, sodium or potassium, although metallic elements in the second row of the Periodic Table such as barium, magnesium or calcium may be useable, as may transition metals such as copper, iron or cobalt.

The quaternary ammonium ion comprises formula XIII below:

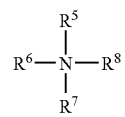

where $R^5-R^8$, which may be the same or different, are $C_1-C_{10}$ alkyl, $C_2-C_{10}$ alkenyl, $C_3-C_{10}$ cycloalkyl, aryl, $C_1-C_{10}$ alkylaryl, aryl $C_1-C_{10}$ alkyl or aryl $C_1-C_{10}$ cycloalkyl, provided that any two of $R^5-R^8$ may be part of an optionally unsaturated carbocyclic ring. Aryl is suitably optionally substituted phenyl, where the phenyl ring may be substituted, for example with $C_1-C_{10}$ alkyl, particularly $C_1-C_6$ alkyl, or halo, particularly Cl, Br or F. Examples of a quaternary ammonium cation include a tetra $C_1-C_{10}$ alkylammonium cation, particularly a tetra $C_1-C_5$ alkylammonium cation, for example tetramethylammonium, tetraethylammonium or tetra-n-butylammonium, or a tri $C_1-C_{10}$ alkylarylammonium cation wherein aryl is phenyl, substituted phenyl (with phenyl being substituted as above), or phenyl-substituted $C_1-C_{10}$ alkyl or $C_3-C_{10}$ cycloalkyl. Tetramethylammonium cation (i.e. where $R^5-R^8$ in formula XIII are each $C_1$ alkyl) is particularly suitable.

In one aspect therefore the invention of the parent application relates to the use of initiators comprising formula (XIV) below:

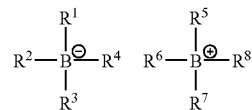

where $R^1-R^8$ are as defined above.

An alkyl group may suitably have 1–6 carbon atoms, for instance 2–4 carbon atoms, and may be straight chain or branched, provided a suitable number of carbon atoms are available for branching. A carbocyclic ring may be bridged by the boron atom.

Suitably at least two, and desirably three, and in some instances four, of $R^1-R^4$ are $C_1-C_{10}$ alkyl.

Preferably the alkylated borohydride is of formula XII; M is an alkali metal ion such as lithium, sodium, potassium, or cesium, particularly lithium, sodium or potassium, although metallic elements in the second row of the Periodic Table such as barium, magnesium or calcium may be useable, as may transition metals such as copper, iron or cobalt; $R^1-R^3$ may suitably be the same or different alkyl group and each may suitably be a $C_1-C_6$ alkyl group, particularly a $C_2-C_4$ alkyl group. Desirably the three alkyl groups $R^1-R^3$ are the same group. A cycloalkyl group may suitably be $C_5-C_6$ group.

Examples of suitable metal salts in which $R^1-R^3$ are the same alkyl group include lithium triethylborohydride, sodium triethylborohydride, potassium triethylborohydride, lithium tri-sec-butylborohydride, sodium tri-sec-butylborohydride, potassium tri-sec-butylborohydride, lithium trisiamylborohydride, potassium trisiamylborohydride and lithium triethylborodeuteride. A particularly suitable example is lithium tri-sec-butylborohydride.

An example of a compound in which $R^2$ is an alkyl group and $R^1$ and $R^3$ are H is lithium thexylborohydride. An example of a compound in which $R^1$ and $R^3$ form part of a cyclic ring is lithium 9-borabicyclo[3.3.1]-nonane ("9BBN") hydride.

Desirably at least one of $R^2$ and $R^3$ is a $C_1$–$C_{10}$ alkyl group or phenyl, provided that not more than one of $R^2$ and $R^3$ is phenyl. It will be understood by those skilled in the art that a phenyl group may be substituted in the ring by one or more substituents, which do not affect the activity of the compound of formulae VI or VII as a polymerization initiator. Such ring-substituents include $C_1$–$C_{10}$ alkyl, for example $C_1$–$C_6$ alkyl, particularly methyl.

The above-identified compounds of formula VI are commercially available from various suppliers such as Aldrich Chemical Co., e.g., under tradenames such as SUPERHYDRIDE, SELECTRIDE, and SUPER-DEUTERIDE, or Callery Chemicals of Evans City, Pa., under tradenames such as CALSELECT, or are readily prepared by available methods. The commercially available compounds are in flammable solvents, which however are not reactive toward the alkylated borohydrides and borates. Generally, THF and diethyl ether—both combustible and flammable solvents—are the ones chosen. Other suitable compounds include the metal borohydrides analogous to the boron compounds as described in the Ritter patents such as diisopinocamphenylborane, dicyclohexylborane, and diisoamylborane.

To this end, Irish Patent Application No. 2001/0937 filed 23 Oct. 2001, Irish Patent Application No. 2001/0980 filed 23 Oct. 2001, Irish Patent Application No. 2002/0286 filed 19 Apr. 2002, and Irish Patent Application No. 2002/0293 filed 23 Apr. 2002, from which the parent application claims priority, are each hereby expressly incorporated herein by reference in their entirety.

The quantity of the initiator system may suitably be such as to provide 0.01% to 5% by weight, particularly 0.01% to 2% by weight, such as 0.1 to 1% by weight, of boron in the total composition. For ease in handling, the initiator system is suitably used in a solution of a carrier whose flash point is above 140° F., desirably above 200° F., in a concentration up to about 1.5M, such as about 1M, although the person skilled in the art will select a suitable concentration depending upon the carrier used.

The initiator system is placed in a carrier, which may be in the liquid or solid state, provided that when in the solid state, the carrier is capable of being solubilized by some or all of the remaining components in the inventive composition and provided that the flash point of the carrier is above 140° F., desirably above 200° F.

Waxes useful as some or all of the carrier in the present invention include petroleum waxes, vegetable waxes, insect waxes, animal waxes and synthetic waxes. While waxes are generally solid at ambient temperature conditions, they find utility as some or all of the carrier, to the extent they are soluble in or more of the constituents used to make the compositions, or in the compositions themselves.

Petroleum wax includes a range of relatively high-molecular-weight hydrocarbons (approximately $C_{16}$ to $C_{50}$), is solid at room temperature, and is derived from higher boiling petroleum fractions. Three basic categories of petroleum-derived or shale-oil-derived waxes include paraffin (crystalline) wax, microcrystalline wax and petrolatum wax.

Paraffin waxes are produced from the lighter lube oil distillates, generally by chilling the oil and filtering the crystallized wax. Paraffin waxes have a distinctive crystalline structure and a melting point range generally between 48° C. (118° F.) and 71° C. (160° F.). Paraffin wax is macrocrystalline and is composed of about 40–90% normal alkanes with a remainder of $C_{18}$–$C_{36}$ isoalkanes and cycloalkanes. Paraffin wax is a petroleum-derived wax usually consisting of high-molecular-weight normal paraffins; distinct from other natural waxes, such as beeswax and carnauba wax (palm tree), which are composed of high-molecular-weight esters, in combination with high-molecular-weight acids, alcohols, and hydrocarbons.

Refined paraffin waxes are low oil, or low liquid paraffin, content waxes, generally with an oil content of 1.0 weight percent or less, under conditions prescribed by test method ASTM D 721. Fully refined paraffin waxes generally have even lower oil content of about 0.5 weight percent or less under the same conditions.

Microcrystalline waxes are produced from heavier lube distillates and residua usually by a combination of solvent dilution and chilling. They differ from paraffin waxes in having poorly defined crystalline structure, darker color, higher viscosity, and higher melting points which typically range from 63° C. (145° F.) to 93° C. (200° F.) Microcrystalline waxes contain more branched and cyclic compounds than paraffin waxes and also vary more widely than paraffin waxes in their physical characteristics. Microcrystalline waxes can be somewhat ductile, but are also often brittle and crumble easily.

Petrolatum waxes (CAS Registry No. 8009-0-8) are derived from heavy residual lube stock by propane dilution and filtering or centrifuging. They are microcrystalline in character, semisolid at room temperature and consist predominantly of saturated crystalline and liquid hydrocarbons having carbon numbers greater than $C_{25}$.

Useful insect and animal waxes include, but are not limited to, beeswax, spermaceti wax, Chinese wax, wool wax, and shellac wax. The major components of beeswax (CAS Registry No. 8012-89-3) are esters of $C_{30}$ and $C_{32}$ alcohols with $C_{16}$ acids, free $C_{25}$ to $C_{31}$ carboxylic acids, and $C_{25}$ to $C_{31}$ hydrocarbons. Beeswax typically has a melting point of about 60 to 70° C. Spermaceti wax (CAS Registry Nos. 8002-23-1 and 68910-54-3) is derived from the sperm whale and has a melting point of about 42 to 50° C. Chinese wax (CAS Registry No. 8001-73-8) is formed on branches of ash trees (*Fraximus chinensis*) from the secretion of the coccus insect (*Coccus ceriferus*). It is a hard wax with a melting point of about 80 to 84° C. Wool wax (CAS Registry No. 68815-23-6) or lanolin wax (CAS Registry No. 68201-49-0) is extracted from sheep's wool and has a melting point of about 36 to 43° C. Shellac wax is obtained from the lac of a scale insect (Coccus lacca) that feeds on certain trees in southern Asia and has a melting point of about 79 to 82° C.

Useful vegetable waxes include, but are not limited to, carnauba wax, candelilla wax, Japan wax, ouricury wax, rice-bran wax, jojoba wax, castor wax, bayberry wax, and soy bean wax. Carnauba wax (CAS Registry No. 8015-86-9) is produced from fronds of a palm tree. The major components of carnauba wax are aliphatic and aromatic esters of long-chain alcohols and acids, with smaller amounts of free fatty acids and alcohols, and resins. Carnauba wax is very hard with a melting point of about 83 to 86° C. Candelilla wax (CAS Registry No. 8006-44-8) is produced from shrubby spurges (*Euphorbia antisyphilitica*) native to southwest Texas and Mexico. The major components of candelilla wax are hydrocarbons, esters of long-chain alcohols and acids, long-chain alcohols, sterols, and neutral resins, and long-chain acids. Typically, candelilla wax has a melting point of about 67 to 70° C. Japan wax (CAS Registry No. 8001-39-6) is derived from the berries of a small tree native to Japan and China cultivated for its wax. Japan wax is composed of triglycerides, primarily tripalmitin. Japan wax typically has a melting point of about 48 to 53° C. Ouricury wax (CAS Registry No. 68917-70-4) is a brown wax obtained from the fronds of a palm tree which grows in Brazil and has a melting point of about 79 to 84° C. Rice-bran wax (CAS Registry No. 8016-60-2) is extracted from crude rice-bran oil and has a melting point of about 75 to 80° C. The wax is primarily composed of esters of lignoceric acid, behenic acid, and $C_{22}$–$C_{36}$ alcohols. Jojoba wax (CAS Registry No. 61789-91-1) is obtained from the seeds of the jojoba plant. Castor wax (CAS Registry No. 8001-78-3) is catalytically hydrogenated castor bean oil. Bayberry wax (CAS Registry No. 8038-77-5) is obtained from the surface of the berry of the bayberry (myrtle) shrub. The wax is made up primarily of lauric, myristic, and palmitic acid esters. The wax has a melting point of about 45 to 49° C.

Useful mineral waxes include, but are not limited to, montan wax, peat wax, ozokerite wax and ceresin wax. Montan wax (CAS Registry Nos. 8002-53-7) is derived by solvent extraction of lignite. The wax components of montan is a mixture of long chain ($C_{24}$–$C_{30}$) esters, long-chain acids, and long chain alcohols, ketones, and hydrocarbons. Crude montan wax from Germany typically has a melting point of about 76 to 86° C. Peat waxes are much like montan waxes and are obtained from peat and has a melting point of about 73 to 76° C. Ozokerite wax (CAS Registry No. 001-75-0) was originally a product of Poland, Austria and the former USSR where it was mined and has a melting point of about 74 to 75° C. Ceresin wax (CAS Registry No. 8001-75-0) originally was a refined and bleached ozokerite wax.

Synthetic waxes include, but are not limited to, polyethylene waxes α-olefin waxes, carbowaxes and halowaxes. Polyethylene waxes (CAS Registry No. 8002-72-4) are obtained polymerization of polyethylenes or by Fischer-Tropsch synthesis. The waxes have melting points ranging from about 45-106° C. These waxes may also be chemically modified to vary properties, such as acid number. Polymerized α-olefins can be produced to have waxlike properties and are sold as synthetic waxes. The polymerization process yields highly branched materials, with broad molecular weight distributions. Carbowaxes (CAS Registry Nos. 9004-74-4 and 25322-68-3) are high molecular weight polyethylene glycols. Halowaxes (CAS Registry Nos. 1321-65-9, 1335-87-1, 1335-88-2, 12616-35-2, 12616-36-3, 25586-43-0, 57817-66-7 and 58718-67-5) are chlorinated naphthalenes.

Examples of particularly desirable carriers include generally those selected from certain ethers, epoxies, and hydrocarbons, and more specifically poly(tetrahydofurane), 2-haloalkyl phenyl ethers, such as 2-bromoethyl phenyl ether [flash point, 150° F. (65.3° C.)], 2-chloro ethyl phenyl ethyl, glycidoxy alkyltrialkoxyl silanes, such as 3-glycidoxypropyltrimethoxysilane, certain glycidyl ethers, such as glycidyl heptyl ether, glycidyl undecyl ether, glycidyl ether, glycidyl heptyl ether, propanediol diglycidyl ether, butene diol glycidyl ether, cyclohexane dimethanol diglycidyl ether, 2-ethyl hexyl glycidylether, 1-benzyl-2,3-isopropylidene-S/N-glycerol, and the like. For instance triglyme (flash point, 175° F.) and tetraglyme (flash point, 230° F.) are particularly desirable.

The use of tetraglyme as a carrier for the initiator system has proven particularly desirable from the standpoint of processing ease and flammability/combustibility reduction.

Carriers useful in the present invention solubilize the initiator system at the amount intended to be used, are unreactive toward the initiator system and have a flash point greater than 140° F., desirably greater than 200° F.

The quantity of carrier may suitably be in the range from about 2% to about 50% by weight, for example 2% to 40% by weight, particularly 2% to 30% by weight, of the total composition.

It is important that the initiator system and the carrier do not react together or start to cross-link, causing a change in viscosity, before polymerization of the total polymerizable composition is initiated.

For this reason, the initiator system and carrier are suitable for packaging together in Part B—the initiator component—of a two-part composition.

In a further aspect of the invention, there is provided an indication system for use in moderating the cure speed of the adhesive system as well as determining when the cure is complete.

More specifically, in this aspect the present invention provides a free radical polymerizable composition, such as one having a (meth)acrylate component, and adhesives based on such free radical polymerizable compositions. Ordinarily, the compositions include a (meth)acrylate component, an initiator system, a carrier for the initiator system, in which the initiator system is soluble, which is unreactive toward the initiator system, and which has a flash point above 140° F., desirably above 200° F., and an indicator system that may control the rate, and indicate the beginning, of cure.

The indicator system is substantially dissolved in the composition, particularly the (meth)acrylate part thereof (Part A), to provide a first color to the (meth)acrylate component, where after mixing with the initiator part (Part B) for a pre-determined amount of time, the composition undergoes a color change as an indication that cure is beginning to occur.

For instance, as reported in H. C. Brown, *Boranes in Organic Chemistry*, Cornell University Press, 433–39 (1972), the disclosure of which being expressly incorporated herein by reference, 5 mole percent iodine inhibits the rate of oxygen absorption by tri-n-butyl borane for 12.5 minutes at 0° C., and tris-(2-methyl-1-pentyl)borane inhibits oxygen absorption for 32 minutes. See supra at 435.

The inclusion in the inventive polymerizable composition of the indicator system, such as one based on iodine, provides the ability to control the rate of oxygen absorption which translates into rate of polymerization, as well as the ability to monitor when polymerization is complete, as the indictor system assumes one color initially in the uncured composition and a second color once polymerization is complete.

The polymerizable composition may suitably be a two-part composition in which the free-radically polymerizable monomer component is provided in one part and an initiator system is provided in the other part. Alternatively, the initiator system may be provided as a primer, where the initiator system is applied to a substrate separately from the adhesive composition.

In a still further aspect the invention provides a two-part polymerizable adhesive composition, which includes:

part A—(meth)acrylate component, optionally with an acid; and part B—an effective amount of a polymerization initiator comprising an organoborane complex, and a carrier for which inert to the organoborane complex, where each part has a flash point greater than 140° F., preferably greater than 200° F.

Either part A, part B, or both may further include a toughener, filler and/or thickener.

Suitably the compound that is reactive with the organoborane complex, is present in part A of a two-part polymerizable acrylic adhesive composition as described above.

Moisture is excluded from contact with the organoborane complex until polymerization has been initiated. Suitably part B of the two-part adhesive composition is packaged in a moisture-free and moisture-impermeable applicator or other container.

The compositions of the invention are particularly useful for bonding low surface energy substrates, such as those having a surface energy of less than 45 mJ/m$^2$, more particularly polyolefins including polyethylene and polypropylene, acrylonitrile-butadiene-styrene and polytetrafluoroethylene, or relatively low surface energy substrates such as polycarbonate, to similar substrates, to each other, or to different substrates including metals, other plastics and glass.

In a particular aspect the invention relates to an adhesive composition as defined above for bonding a low surface energy substrate to a similar or different substrate. In such composition in which a compound of formula XII is used as a part of the initiator system, it is preferred that at least two of $R_1$ and $R_2$ are straight chain $C_1$–$C_4$ alkyl.

Further the invention provides a method for bonding a substrate to a similar or different substrate, where the method comprises applying an adhesive composition as defined above to at least one of the substrates, bringing the substrates together and allowing the composition to cure. In one aspect, the invention provides a method as defined above for bonding a low surface energy substrate such as a polyolefin substrate to a similar or different substrate.

In particular the invention provides a method for bonding a substrate, particularly a low surface energy substrate, to a similar or different substrate, where the method includes mixing parts A and B of a two part adhesive composition prior to use in order to initiate polymerization, applying the mixed composition to at least one of the substrates, bringing the substrates together and allowing the composition to cure by completion of the polymerization initiated on mixing of the parts A and B.

The acid when added as a decomplexer or reactant to free an organoborane in the initiator system may be a weak acid, such as having a pKa no lower than about 0.5 with the desirable limit being about 0.9. The upper limit normally is about 13, or less, such as about 11.5. Carboxylic acids, which have a pKa of up to about 8, such as about 6 or about 7, are particularly useful. An effective amount of the acid, is about 0.1 to about 25%, preferably from about 0.1 to about 20%, and more preferably from about 0.5 to about 10% based on a total weight of the (meth)acrylate composition.

Suitable acids may be monobasic or polybasic. Examples of suitable acids are formic acid, acetic acid, propionic acid, maleic acid, malic acid, fumaric acid, acrylic acid and copolymers thereof, methacrylic acid and copolymers thereof, pyruvic acid, itaconic acid, nadic acid, benzoic acid, phthalic acids, cinnamic acid, trichloroacetic acid, and saccharin.

Lewis acids may also be used. The acid may also be present as a latent acid, particularly a masked carboxylic acid compound hydrolyzable on contact with moisture, such as an acid anhydride, such as described in European Patent No. EP 356 875 and U.S. Pat. No. 5,268,436, the contents of which are incorporated herein by reference.

While organoborane complexes with or without alkylated borohydrides or borates are effective initiators without an acid, the inclusion of an acid (which term includes a latent acid) together with the free radical polymerizable monomer component is desirable. For certain substrates and/or certain polymerization speeds, the presence of an acid may be required. In the case of a two-part composition, the reaction takes place after mixing of the two parts, one containing the initiator system and the other containing the acid or other compound reactive therewith.

The aziridine-containing compound has at least one aziridine ring or group:

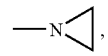

where the carbon atom(s) may be optionally substituted with short chain alkyl groups having from one to ten carbon atoms, preferably methyl, ethyl or propyl such that methyl, ethyl or propyl aziridine moieties are formed. Polyfunctional aziridines, such as trimethylolpropane tris(3-(2-methylaziridino)propionate, are particularly useful.

The aziridine-containing compound is preferably soluble in the (meth)acrylate, such that the parts of a multi-part adhesive system can be readily mixed. By "soluble" is meant that no evidence of gross phase separation at room temperature, i.e., about 22° C. to about 25° C., is visible to the unaided eye. Suitably, the aziridine-containing compound is a liquid at or near room temperature, i.e., within about 10° C. of room temperature.

As noted, tougheners may be added. Suitable tougheners include elastomeric materials such as polybutadiene rubbers, polyisoprene, available under the trade name KRATON® from Shell Chemical Corp., Houston, Tex., acrylonitrile-butadiene-styrene ("ABS"), available under the trade name HYCAR®, or as core-shell polymers under the trade name BLENDEX®, or polystyrenes.

For bonding polyolefins, it is desirable to use a core-shell polymer. The use of core-shell polymers in (meth)acrylate compositions is described, for example, in U.S. Pat. Nos. 4,536,546 and 4,942,201, the disclosures of each of which are hereby expressly incorporated therein by reference. Core shell polymers are suitably graft copolymer resins, e.g., ABS graft copolymers, or others described in the '546 and '201 patents, in the form of particles that comprise rubber or rubber-like cores or networks that are surrounded by relatively hard shells. In addition to improving the impact resistance of the bond, core-shell polymers can also impart enhanced spreading and flow properties to the composition. These enhanced properties include a reduced tendency for the composition to leave an undesirable "string" upon dispensing from a syringe-type applicator, or sap or slump after having been applied to a vertical surface. The quantity of toughener, when used, may suitably be in the range from about 1% to about 40%, preferably about 5% to about 25%, based on a total weight of the composition.

Polymeric thickeners may be present in the compositions in an amount up to about 50%, and may be polymers or prepolymers of low or high molecular weight. Suitable polymeric thickeners are a commercially available methacrylate polymer sold under the trademark ELVACITE®, available from E.I. DuPont de Nemours, Wilmington, Del., as well as styrene-methyl methacrylate copolymers, polybisphenol A maleate, or propoxylated bisphenol-A-fumarate polyester sold under the trademark ATLAC®.

Inert fillers, such as finely divided silica, fumed silica (treated or untreated), montmorillonite, clay, bentonite and the like, may also be added. The use of micronized silica can result in a paste-like thixotropic composition. Polymeric thickeners or other thickeners such as silica may suitably be present as a thickener in both Parts A and B of a two-part composition. Inert fillers such as wood flour, cornstarch, glass fibers, cotton lintners, mica, alumina, silica, teflon and the like may be used to alter physical properties, such as modifying viscosity, improving impact resistance, and the like. Such fillers may be incorporated in the inventive compositions in an amount within the range of from about 0.5% to about 20%, for example about 1% to about 10%, by weight of the composition.

It is a particular advantage of the invention that polyolefin and other low surface energy materials can be used as fillers in the composition. Polyolefin powders such as polyethylene powder are relatively inexpensive. In a composition which readily bonds to a polyolefin, the filler becomes securely adhered into the cured composition. Polyethylene or polypropylene powders can be used with particle sizes in the range from about 0.01 microns to about 1 micron, particularly about 0.02 microns to about 0.3 microns, allowing for a good control of the gap between substrates, i.e., the depth of adhesive. Particularly suitable polyethylene powders are commercially available under the trade name MICROTHENE® available from Equistar Chemicals LP, Houston, Tex. Polyethylene flock and polyolefin chopped fibers can also be used as fillers. The amount of polyolefin filler that may be used in the present invention, is about 0.5% to about 20%, preferably about 1% to about 10% based on a total weight of the composition.

Small amounts of silane coupling agents may also be added to increase moisture resistance and well as to enhance bond strength with glass and similar surfaces.

The composition of the present invention may suitably comprise about 0.01% to about 5% by weight of the initiator, about 5% to about 50% by weight of the carrier(s), about 0.1% to about 20% of the decomplexer, e.g., an acid, about 5% to about 85% by weight of the polymerisable monomer(s) and about 1% to about 40% by weight of the toughener (if present).

In a two part adhesive system of the present invention, the parts may suitably be provided in a weight ratio in the range from about 1:10 to about 1:1 of initiator component B to monomer-containing Component A, for example from about 1:10 to 1:2, or from about 1:10 to 1:4.

The composition may optionally include oxidizing agents, reducing agents, thickeners, non-reactive dyes and pigments, reaction indicators (as noted), fire retarders, stabilizers, such as quinones and hydroquinones, thixotropes, plasticizers and antioxidants. The optional additives are used in an amount that makes up the total composition as 100% and that does not significantly adversely affect the polymerization process or the desired properties of polymerization products made thereby.

No light-absorbing dyes, cationic dyes, visible light or ultraviolet radical polymerization initiators or hexaarylbiimidazole are required in the adhesive compositions of the invention. In fact, in preferred compositions none are present.

EXAMPLES

Example 1

A two part composition in accordance with the invention of the parent application was prepared as follows: Part A was prepared using the following components in the noted weight percentages: tetrahydrofurfuryl (meth)acrylate, 45%, 2-ethyl hexyl(meth)acrylate, 15%, ATLAC® 22%, (meth) acryloyoxyethyl maleate, 12.5%, fumed silica (AEROSIL 200), 3.5%, and glass beads (125–150 um), 2%.

Part B was prepared by lithium tri-sec-butyl borohydride (1M in THF) in an amount of 40 parts by weight adding at room temperature to trimethylol propane tri-3,2-methylaziridine propionate in an amount of 60 parts by weight. The THF was removed under vacuum, and to this mixture was added a fumed silica (HDK-2000) in an amount of 7% by weight. Then, tetraglyme was added as a carrier in varying amounts to different portions of the mixture: 11.5%, 23.7% and 32.0% by weight. Next, Part A was mixed into Part B in a 10:1 ratio and dispensed into aluminum dishes. Polymerization was observed to occur immediately, with full cure confirmed after 3 days.

Example 2

In this example, the same akylated borohydride (1M in THF) was used and tetraglyme was added thereto. THF was removed under vacuum to yield an approximately 1M solution of lithium tri-sec-butyl borohydride in tetraglyme. The aziridine and the fumed silica from above were added with the weight percentages of each component in the Part B as follows: Aziridine, 54.38%, borohydride in tetraglyme, 36.25%, and silica, 9.37%.

The same Part A as above was used. The Part A and the Part B were manually transferred from their mixing vessel, to a 10:1 ratio dual cartridge polypropylene syringe, from which the two parts were dispersed through a static mixer and dispensed onto various low energy substrates.

In order to evaluate the lap shear strength and block shear strength, the area on the substrates to be bonded was cleaned with isopropyl alcohol, the adhesive was applied to one of the substrates through the static mixer, two 0.005" spacers were placed in the applied bead of adhesive, the second substrate was mated with the first substrate, so as to form a 0.5" overlap, the substrates with the adhesive therebetween were clamped together, and the assemblies were allowed to cure for 24 hours at ambient temperature and humidity conditions. Some of the assemblies were conditioned at a temperature of 120° F. at 100% relative humidity ("RH") for a period of time of 1 week, if indicated.

The shear strength of the bonded assemblies was determined on an Instron, with the peak strength (in psi) and failure modes observed and recorded. The bonded assemblies made from plastic substrates were tested at a shear rate of 0.5"/minute and those made from metals at a shear rate of 0.05"/minute.

The results from five replicate runs are shown below in Tables 1–2. PP is polypropylene; LDPE is low density polypropylene; HDPE is high density polypropylene; PVC is polyvinyl chloride; ABS is acrylo-butadiene-styrene; and PC is polycarbonate.

TABLE 1

| Run | Substrate | Test | Conditioning | Shear Strength Values (psi) | | |
|-----|-----------|------|--------------|------|------|--------|
| | | | | Mean | Std Dev | % Ret. |
| 1 | PP | Block shear | None | 1600 | 311 | — |
| 2 | LDPE | Block shear | None | 2348 | 492 | — |
| 3 | HDPE | Block shear | None | 2195 | 271 | — |
| 4 | PVC | Block chear | None | 1955 | 522 | — |
| 5 | PC | Block shear | None | 2145 | 320 | — |
| 6 | ABS | Block shear | None | 1331 | 118 | — |
| 7 | PP | Block shear | 120° F./100% RH | 1026 | 325 | 64 |
| 8 | LDPE | Block shear | 120° F./100% RH | 1300 | 308 | 55 |
| 9 | HDPE | Block shear | 120° F./100% RH | 2401 | 342 | 109 |
| 10 | Steel | Lap shear | None | 1460 | 142 | — |
| 11 | Aluminum | Lap shear | None | 969 | 140 | — |
| 12 | Stainless | Lap shear | None | 996 | 165 | — |
| 13 | Steel | Lap shear | 120° F./100% RH | 0 | 0 | 0 |
| 14 | Steel | Lap shear | 120° F./100% RH | 160 | 151 | 18 |

TABLE 2

| Run | Substrate | Test | Failure Mode | Conditioning |
|-----|-----------|------|--------------|--------------|
| 1 | PP | Block shear | Substrate/Adh. | None |
| 2 | LDPE | Block shear | Cohesive | None |
| 3 | HDPE | Block shear | Cohesive | None |
| 4 | PVC | Block shear | Cohesive | None |
| 5 | PC | Block shear | Cohesive | None |
| 6 | ABS | Block shear | Substrate | None |
| 7 | PP | Block shear | Adhesive | 120° F./100% RH |
| 8 | LDPE | Block shear | Substrate | 120° F./100% RH |
| 9 | HDPE | Block shear | Cohesive | 120° F./100% RH |
| 10 | Steel | Lap shear | Adhesive | None |
| 11 | Aluminum | Lap shear | Adhesive | None |
| 12 | Stainless | Lap shear | Adhesive | None |
| 13 | Steel | Lap shear | Adhesive | 120° F./100% RH |

Example 3

Here, Part A from above was used, except the following weight percentage of each component were: THF (meth)acrylate, 48%, 2-ethylhexyl(meth)acrylate, 16.5%, ATLAC®, 22%, (meth)acyloyloxyethyl maleate, 8%, silica, 3.5% and glass beads (125–150 um), 2%.

The same alkylated borohydride (1M in THF) was used, and the aziridine from above was added. THF was removed under vacuum, and tetraglyme was then added to the mixture. Fumed silica was then introduced with mixing to yield a Part B with following weight percentages of each component; aziridine, 54.38%, borohydride, 7.75%, tetraglyme, 28.5%, and silica, 9.37%.

The flash point of Part B was measured in accordance with ASTM D3278 and determined to be greater than 200° F. The individual components of Part B each have flash points greater than 140° F., and all but tetrahydrafurfuryl (meth)acrylate (195° F.) and 2-ethyl hexyl(meth)acrylate (198° F.) have a flash point greater than 200° F.

Example 4

A 1:10 initiator:adhesive formulation was prepared as follows:

| Adhesive component (Part A) | |
|---|---|
| Core-shell toughener (Blendex 336*) | 100 g |
| Tetrahydrofurfuryl methacrylate | 249.5 g |
| 2-ethylhexyl methacrylate | 83.2 g |
| Maleic acid, mono-2-methacryloyloxyethyl ester | 67.3 g |

*The core-shell toughener is commercially available from General Electric Specialty Chemicals via Blagden Chemical Specialities Limited, London WC1X 8NJ, England under the tradename Blendex 336.

| Initiator component (Part B) | |
|---|---|
| Triethylborane: 1,3-diaminopropane complex in tetraglyme (1 M) | 2.0 g |
| Trimethylolpropane tris(2-methyl-1-aziridinepropionate) + 5% fumed silica (AEROSIL R972*) | 3.0 g |

*The fumed silica used is commercially available under the tradename AEROSIL R972 from Degussa, locally through Philips Duphar (Ireland) Limited, Dublin, Ireland.

The initiator component and adhesive component were packaged respectively into the two syringes of a MIXPAC 1:10 volume ratio 50 ml dual syringe applicator* having a 1:10 volume ratio between the syringes holding the components B and A respectively. The two components were mixed by simultaneous extrusion through a 17 stage static mixer nozzle.

The applicator and static mixer are commercially available from METIX (UK) Limited, Kettering NN16 8PX, England.

The mixed adhesive composition was tested on a range of substrates as follows: Samples of the adhesive were spread onto an untreated test-piece (4×1 inches) (101.6×25.4 mm) to form a film of approximately 0.1 mm in depth. Following which a second test-piece was brought against the adhesive to form an overlap adhesive joint with 0.25 inch (6.3 mm) overlap. A clamp was applied to the overlap area and the adhesive joint allowed to cure at room temperature. One set of samples was allowed to cure for 3 hours and the other set was allowed to cure overnight, approximately 24 hours.

The bond strengths for bonds assembled using the above procedure were tested on a Instron tester according to ASTM-D1002 and are presented in the tables below.

| Substrates | Shear Strengths (MPa) |
|---|---|
| 3 Hour Cure | |
| Polyethylene/polyethylene | 2.65 +/− 0.8 |
| Polyethylene/polypropylene | 4.0 +/− 0.24 |
| 24 Hour Cure | |
| Polyethylene/polyethylene | 4.6 +/− 0.8 |
| Polyethylene/polypropylene | 4.7 +/− 0.3 |

What is claimed is:

1. A polymerizable adhesive composition for bonding a low surface energy substrate to a similar or different substrate, comprising:
   a) at least one free-radically polymerizable monomer component, and
   b) an effective amount of an initiator system for initiating polymerization of the free-radically polymerizable monomer, said initiator system comprising:
      i) a complex of an organoborane with a complexing agent; and
      ii) an aziridine-containing compound; and
   c) a carrier for the initiator system of b), which renders the composition having a flash point greater than 140° F.

2. A composition according to claim 1 which is a two-part composition in which the free-radically polymerizable monomer component is provided in one part and the initiator system of b)i) is provided in the other part.

3. A composition according to claim 1 which is a two-part composition in which the free-radically polymerizable monomer component is at least one (meth)acrylate monomer which is provided in one part and the initiator system of b)i) is provided in the other part.

4. A two-part polymerizable adhesive composition according to claim 3 comprising:
   part A) at least one (meth)acrylate monomer, optionally with one or more of a toughener, acid, filler and thickener; and
   part B) an effective amount of an initiator system of b)i), and a carrier for which inert thereto.

5. A two-part polymerizable adhesive composition according to claim 3 comprising:
   part A) at least one (meth)acrylate monomer together with a compound reactive with an initiator system of b)i) to free an organoborane therefrom and optionally with on one or more of a toughener, filler and thickener; and
   part B) an effective amount of an initiator system of b)i), a carrier for which inert thereto, and optionally at least one (meth)acrylate monomer, optionally with one or more of a toughener, filler and thickener, but without any compound that is reactive with the initiator system to free an organoborane therefrom.

6. A composition according to claim 1 wherein the initiator system also comprises alkylated borohydrides or borates comprising formula (XII) below:

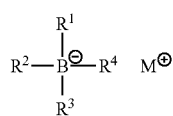

XII wherein $R^1$ is $C_1$–$C_{10}$ alkyl,
   $R^2$ and $R^3$, which may be the same or different, are H, D, $C_1$–$C_{10}$ alkyl or $C_3$–$C_{10}$ cycloalkyl, phenyl, or phenyl-substituted $C_1$–$C_{10}$ alkyl or $C_3$–$C_{10}$ cycloalkyl, provided that any two of $R^1$–$R^3$ may optionally be part of a carbocyclic ring,
   $R^4$ is H, D or $C^1$–$C^{10}$ alkyl, and
   $M^+$ is a metal ion or a guaternary ammonium ion comprising formula (XIII) below

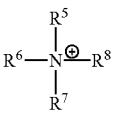

XIII wherein $R^5$–$R^8$, which may be the same or different, are $C_1$–$C_{10}$ alkyl, $C_2$–$C_{10}$ alkenyl, $C_3$–$C_{10}$ cycloalkyl, aryl, $C_1$–$C_{10}$ alkylaryl, aryl $C_1$–$C_{10}$ alkyl or aryl $C_1$–$C_{10}$ cycloalkyl, provided that any two of $R^5$–$R^8$ may be part of an optionally unsaturated carbocyclic ring.

7. A composition according to claim 6 wherein three of $R^1$–$R^4$ of the alkylated borohydride or borate of formula XII are the same $C_1$–$C_{10}$ alkyl group and one of $R^1$–$R^4$ is phenyl or phenyl-substituted $C_1$–$C_{10}$ alkyl.

8. A composition according to claim 6 wherein three of $R^1$–$R^4$ of the alkylated borohydride or borate of formula XII are the same $C_2$–$C_4$ alkyl group and one of $R^1$–$R^4$ is phenyl.

9. A composition according to claim 6 wherein each of $R^5$–$R^8$ of the quaternary ammonium ion of formula XIII is the same $C_1$–$C_5$ alkyl group.

10. A composition according to claim 6 wherein the initiator system includes a compound of the formula:

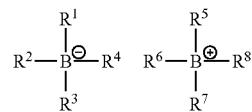

wherein $R^1$–$R^3$ are each the same $C_1$–$C_6$ alkyl group,
   $R^4$ is phenyl;
   $R^5$–$R^8$ are each the same $C_1$–$C_6$ alkyl group.

11. A composition according to claim 6 wherein the initiator system includes a compound selected from the group consisting of tetra methyl ammonium phenyl triethyl borate and tetra methyl ammonium phenyl tri-n-butyl borate.

12. A composition according to claim 1 wherein the initiator system comprises a complex of an organoborane with an amine.

13. A composition according to claim 12 wherein the initiator system includes a complex of the formula (VI):

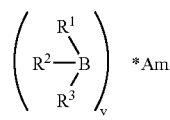

wherein $R^1$ is $C_1$–$C_{10}$ alkyl; $R^2$ and $R^3$, which may he the same or different, are H, D, $C_1$–$C_{10}$ alkyl or $C_3$–$C_{10}$ cycloalkyl, phenyl, or phenyl-substituted $C_1$–$C_{10}$ alkyl or $C_3$–$C_{10}$ cycloalkyl, provided that any two of $R^1$–$R^3$ may optionally be part of a carbocyclic ring; and Am is an amine.

14. A composition according to claim 1 wherein the initiator system comprises a complex of an organoborane with an amidine.

15. A composition according to claim 14 wherein the initiator system includes a complex of the formula (VIII):

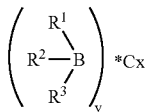

wherein $R^1$, $R^2$, and $R^3$ are as defined in claim 6; the value of 'v' is selected so as to provide an effective ratio of amidine nitrogen atoms to boron atoms in the complex; and Cx represents an amidine compihexing agent of the formula (IX):

where $R^4$ is hydrogen or an organic group; $R^5$ and $R^6$ are independently a monovalent organic group or part of a cyclic structure; w is an integer greater than zero; x is an integer greater than or equal to zero; and y is an integer greater than zero.

16. A composition according to claim 1 wherein the initiator system comprises a complex of an organoborane with a hydroxide or with an alkoxide.

17. A composition according to claim 16 wherein the initiator system comprises a complex of the Formula (VIII):

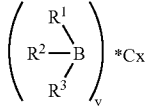

wherein $R^1$, $R^2$, and $R^3$ are as defined in claim 6; the value of 'v' is selected so as to provide an effective ratio of oxygen atoms to boron atoms in the complex; and Cx represents a complexing agent comprising a hydroxide or an alkoxide of the formula (X):

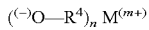

$$(^{(-)}O-R^4)_n M^{(m+)}$$

where each $R^4$ is independently selected from hydrogen or an organic group; $M^{(m+)}$ represents a countercation comprising a monovalent cation or a multivalent cation; n is an integer greater than zero; and m is an integer greater than zero.

18. A composition according to claim 1 wherein the free-radically polymerizable monomer component comprises a (meth)acrylic monomer.

19. A composition according to claim 1 wherein the free-radically polymerizable monomer component comprises at least two (meth)acrylic monomers.

20. A composition according to claim 1 wherein the initiator system is used in an amount sufficient to provide 0.01% to 5% by weight of boron in the total composition.

21. A composition according to claim 1 wherein the aziridine containing compound is trimethylolpropane tris-3-(2-methylaziridino) propionate.

22. A composition according to claim 1 wherein the carrier for the initiator system is selected from triglyme and tetraglyme.

23. A method for bonding together substrates, at least one of which is constructed of a low surface energy material, the steps of which comprise:
  applying a composition according to claim 1 to at least one of the substrates,
  bringing the substrates together with the composition, and allowing the composition to cure.

24. A method for bonding together substrates, at least one of which is constructed of a low surface energy material, the steps of which comprise:
  mixing parts A and B of a two part adhesive composition according to claim 3 prior to use in order to initiate polymerization,
  applying the mixed adhesive composition to at least one of the substrates,
  bringing the substrates together with the composition, and allowing the composition to cure by completion of the polymerization initiated on mixing of the two parts A and B.

25. A cured adhesive composition comprising the polymerization product of a composition according to claim 1.

26. A bonded article comprising two substrates bonded by the polymerizarion product of a composition according to claim 1.

27. A bond formed between two substrates by the polymerization product of a composition according to claim 1.

28. A composition according to claim 1 further comprising a cure indicator.

29. A composite article comprising a first substrate and a second substrate bonded to the first substrate by an acrylic adhesive, wherein the acrylic adhesive comprises the polymerization product of a composition according to claim 1.

30. A polymerizable adhesive composition for bonding a low surface energy substrate to a similar or different substrate, comprising:
  a) at least one free-radically polymerizable monomer component, and
  b) an effective amount of an initiator system for initiating polymerization of the free-radically polymerizable monomer, said initiator system comprising:
    i) a complex of an organoborane complex with a complexing agent; and
    ii) an azirdine-containing compound; and
  an indicator system, which provides a color change as an indication that the composition is beginning to cure.

31. A polymerizable adhesive composition according to claim 30, wherein the cure indicator system is based on iodine.

32. A polymerizable adhesive composition according to claim 30, wherein the initiator system also comprises an alkylated borohydride or borate comprising formula (XII) below:

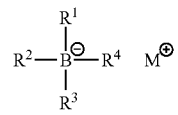

XII wherein $R^1$ is $C_1$–$C_{10}$ alkyl, $R^2$ and $R^3$, which may be the same or different, are H, D, $C_1$–$C_{10}$ alkyl or $C_3$–$C_{10}$ cycloalkyl, phenyl, or phenyl-substituted $C_1$–$C_{10}$ alkyl or $C_3$–$C_{10}$ cycloalkyl, provided that any two of $R^1$–$R^3$ may optionally be part of a carbocyclic ring, $R^4$ is H, D or $C_1$–$C_{10}$ alkyl, and $M^+$ is a metal ion or a guaternary ammonium ion comprising formula (XIII) below

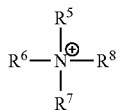

wherein $R^5$–$R^8$, which may be the same or different, are $C_1$–$C_{10}$ alkyl, $C_2$–$C_{10}$ alkenyl, $C_3$–$C_{10}$ cycloalkyl, aryl, $C_1$–$C_{10}$ alkylaryl, aryl $C_1$–$C_{10}$ alkyl or aryl $C_1$–$C_{10}$ cycloalkyl, provided that any two of $R^5$–$R^8$ may be part of an optionally unsaturated carbocyclic ring.

* * * * *